(12) United States Patent
Kang

(10) Patent No.: US 11,809,680 B2
(45) Date of Patent: Nov. 7, 2023

(54) INTERFACE FOR ENGAGING IOT DEVICES WITH AR CAMERA

(71) Applicant: Shin Hwun Kang, Los Angeles, CA (US)

(72) Inventor: Shin Hwun Kang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 16 days.

(21) Appl. No.: 17/565,656

(22) Filed: Dec. 30, 2021

(65) Prior Publication Data
US 2023/0214082 A1 Jul. 6, 2023

(51) Int. Cl.
| | |
|---|---|
| *G06F 3/04815* | (2022.01) |
| *G16Y 40/30* | (2020.01) |
| *G06V 20/20* | (2022.01) |
| *G06F 3/01* | (2006.01) |
| *G06F 3/04886* | (2022.01) |
| *G06T 11/00* | (2006.01) |
| *H04N 23/63* | (2023.01) |
| *G06F 3/04842* | (2022.01) |

(52) U.S. Cl.
CPC .......... *G06F 3/04815* (2013.01); *G06F 3/012* (2013.01); *G06F 3/013* (2013.01); *G06F 3/04886* (2013.01); *G06T 11/00* (2013.01); *G06V 20/20* (2022.01); *G16Y 40/30* (2020.01); *H04N 23/63* (2023.01); *G06F 3/04842* (2013.01); *G06T 2200/24* (2013.01)

(58) Field of Classification Search
CPC ...... G06F 3/04815; G06F 3/012; G06F 3/013; G06F 3/04886; G06F 3/04842; G06T 11/00; G06T 2200/24; G06V 20/20; G16Y 40/30; H04N 23/63

See application file for complete search history.

(56) References Cited

U.S. PATENT DOCUMENTS

| | | | |
|---|---|---|---|
| 9,922,179 B2 * | 3/2018 | Son .......................... | G06F 3/011 |
| 2011/0201362 A1 * | 8/2011 | Bregman-Amitai .... | H04W 4/00 455/466 |

(Continued)

OTHER PUBLICATIONS

International Search Report and Written Opinion received in Patent Cooperation Treaty Application No. PCT/US2022/050302, dated Mar. 6, 2023.

*Primary Examiner* — Maurice L. McDowell, Jr.
(74) *Attorney, Agent, or Firm* — Culhane Meadows PLLC; Stephen J. Weed

(57) ABSTRACT

Systems and methods for controlling an Internet of Things (IoT) device through interaction with an augmented reality (AR) camera includes pairing an interactable augmented reality (AR) overlay with the IoT device. The interactable overlay includes control information for generating a control signal for controlling the IoT device when the interactable overlay is interacted with by the AR camera. The interactable overlay is presented on a display of the AR camera when the IoT device is in a field of view of the AR camera. An indication that the user has pointed the AR camera at the interactable overlay associated with the IoT device on the display of the AR camera is provided, and a control signal associated with the interactable overlay pointed at by the AR camera is provided to the at least one IoT device associated with the interactable overlay pointed at by the AR camera.

20 Claims, 12 Drawing Sheets

(56) References Cited

U.S. PATENT DOCUMENTS

| | | | |
|---|---|---|---|
| 2015/0347850 A1* | 12/2015 | Berelejis | G06V 20/20 |
| | | | 345/633 |
| 2017/0180489 A1* | 6/2017 | Oh | H04L 67/51 |
| 2018/0196522 A1 | 7/2018 | Rochford et al. | |
| 2019/0265787 A1* | 8/2019 | Vennström | G06F 1/163 |
| 2021/0019946 A1* | 1/2021 | Sonasath | G06F 3/0488 |
| 2021/0149551 A1 | 5/2021 | Lee | |
| 2021/0365681 A1* | 11/2021 | Huo | G06T 11/60 |
| 2022/0004764 A1* | 1/2022 | Sandre | G06V 20/20 |

\* cited by examiner

INTERFACE FOR ENGAGING IOT DEVICES WITH AR CAMERA

TECHNICAL FIELD

The present subject matter relates to systems and methods for enabling users of augmented reality (AR) cameras to engage and control real-world Internet of Things (IoT) devices by simply gazing at the IoT devices, and, more particularly, to systems and methods for providing an interface for commanding IoT devices through engagement with AR cameras.

BACKGROUND

The so-called "Internet of Things" or "IoT" is a network of physical objects that are embedded with sensors, software, and other technologies for enabling connection and exchange of data with other devices via the Internet. For example, IoT devices are used in home automation to control lighting, heating and air conditioning, media and security systems, and camera systems. A number of IoT enabled devices has been provided that function as smart home hubs to connect different smart home products. IoT devices have been used in a number of other applications as well. Application layer protocols and supporting frameworks have been provided for implementing such IoT applications. Artificial intelligence has also been combined with the Internet of Things infrastructure to achieve more efficient IoT operations, improve human-machine interactions, and enhance data management and analytics.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
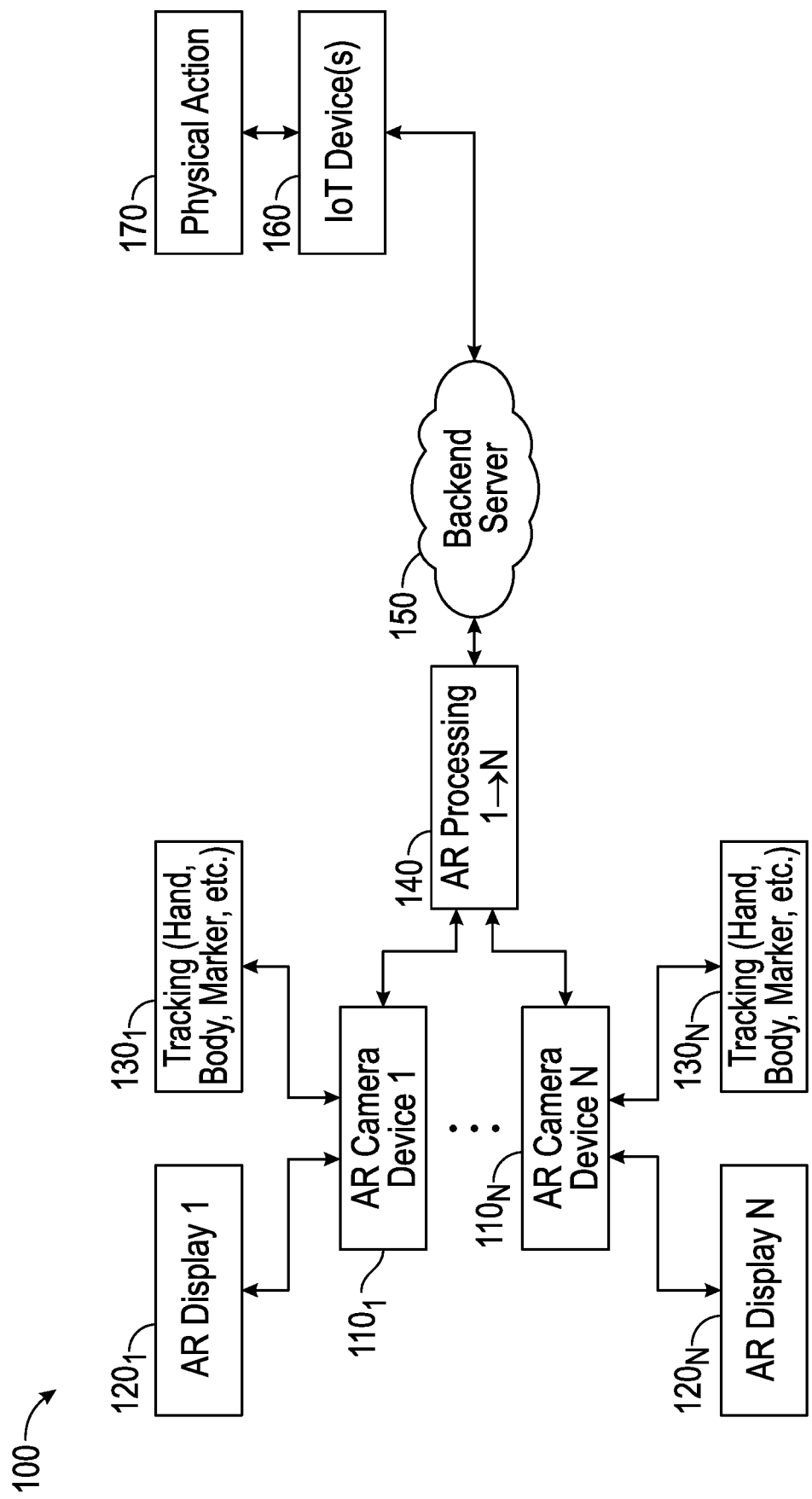
FIG. 1 illustrates a general block diagram of a system for interfacing augmented reality (AR) camera devices to Internet of Things (IoT) devices.

The systems and methods described herein pertain to an interaction layer between an augmented reality (AR) camera device available on various messaging or augmented reality (AR) platforms (e.g., SNAPCHAT® or SPECTACLES™ available from Snap, Inc. of Santa Monica, Calif.) and Internet of Things (IoT) products in the environment of the user of the AR camera. The interaction layer enables a user of the AR camera to easily use her gaze or a tap to interact with IoT products in her environment. As described herein, the AR camera may function as a universal visual remote for controlling IoT devices.

The interaction layer anchors digital content to a physical IoT device counterpart. When the user interacts with a marker associated with the physical IoT device (e.g., by using the AR camera to view the marker), the associated physical IoT device is activated using the digital content. The digital content provides options through an AR overlay on the viewed scene for the different actions the user can take to control the IoT device. For example, an IoT fan object may have an associated marker that provides an AR overlay on the AR camera image when the user views the marker. The user may turn the IoT fan on or off by simply directing the AR camera at a virtual "on" marker or a virtual "off" marker in the AR overlay superimposed on the AR camera image. For example, if the user gazes at the virtual "on" marker for a predetermined amount of time or taps while gazing at the virtual "on" marker, the fan will turn on. On the other hand, if the IoT device is a lamp, the user may select different colors for the lamp by directing the AR camera at an AR overlay with different color options for the lamp for the predetermined amount of time or tapping while gazing at the marker for the desired color option. Instructions would then be sent to change the color of the light of the IoT lamp to the selected color. In this fashion, the interaction layer enables persons with physical disabilities to control IoT devices in the person's environment with minimal physical effort.

The systems and methods described herein may utilize object recognition technology or object tracking technology of the type implemented, for example, by Snap, Inc. of Santa Monica, Calif., in its Snap camera technology to detect people, body parts, or objects and how they move. For example, the object recognition technology may include a combination of computer vision, trained neural networks, and other artificial intelligence and machine learning technologies to recognize objects in the scene. The object recognition technology may also be used to detect how a user moves in relation to or interacts with AR objects. In a sample configuration, the object recognition technology of an electronic eyewear device or smartphone with an AR enabled messaging app may transmit the data it collects to a backend server, which acts as a bridge between the AR objects and other context data from any other services and physical IoT devices. The backend server also may send commands to the IoT devices to act in any number of ways in response to interactions with the AR camera and AR objects.

The systems and methods described herein thus enable control of an Internet of Things (IoT) device through interaction with an augmented reality (AR) camera. An interactable augmented reality (AR) overlay is paired with the IoT device. The interactable overlay includes control information for generating a control signal for controlling the IoT device when the interactable overlay is interacted with by the AR camera. The interactable overlay is presented on a display of the AR camera when the IoT device is in a field of view of the AR camera. An indication that the user has pointed the AR camera at the interactable overlay associated with the IoT device on the display of the AR camera is provided when a user points the AR camera at the interactable overlay for a predetermined period of time or when the user provides a selection input to the AR camera while the AR camera is pointed at the interactable overlay. The selection input may include at least one of a predetermined verbal message, a gesture, or a physical button selection on the AR camera. The interactable overlay may include instructions for providing the selection input. A reticle on the display of the AR camera may help the user identify a focal point of the AR camera and provide feedback to the user that the AR camera is pointed at the interactable overlay associated with the at least one IoT device. A control signal associated with the interactable overlay pointed at by the AR camera is provided to the at least one IoT device associated with the interactable overlay pointed at by the AR camera. By way of example, the interactable overlay may include a virtual ON button and a virtual OFF button or a plurality of virtual buttons representing different commands overlaid over the display of the at least one IoT device.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying FIGS. 1-11 and discussed below.

FIG. 1 illustrates a general block diagram of a system 100 for interfacing augmented reality (AR) camera devices to Internet of Things (IoT) devices in sample configurations. As illustrated, a plurality of AR enabled camera devices $110_1$ through $110_N$, such as Snapchat cameras adapted to include a messaging app such as SNAPCHAT® available from Snap, Inc. of Santa Monica, Calif., include AR displays $120_1$ through $120_N$, respectively, for displaying AR objects. The AR cameras 110 may include a smartphone, a laptop, a desktop, an electronic eyewear device or any other computing device that enables communications via the internet. The AR cameras $110_1$ through $110_N$ are further adapted to include software $130_1$ through $130_N$ to support features such as hand and body identification and tracking, marker tracking in AR space, and the like. Such features are readily available in messaging apps such as the aforementioned SNAPCHAT® messaging app.

The respective AR cameras $110_1$ through $110_N$ may communicate with an AR processing element 140 that provides lenses and may perform object recognition and other services in sample embodiments. Also, the AR processing element 140 may determine the fixation point of the AR cameras $110_1$ through $110_N$ and provide a reticle to the user's display indicating a fixation point of the AR camera. It will be appreciated that the object recognition and related services also may be performed by the software $130_1$ through $130_N$ running on each AR camera $110_1$ through $110_N$ in sample configurations and that an AR processing element 140 may be provided for each AR camera 110 in sample configurations.

As will be explained in more detail with respect to FIG. 2, a backend server 150 acts as a bridge to provide the interaction layer between the AR cameras devices 110 and the physical IoT devices 160. The backend server 150 may send commands to the IoT devices 160 to act in any number of ways as set forth in the examples described herein. As will be explained further below, the IoT devices 160 may be controlled to perform desired physical actions 170 in response to the user interacting with (e.g., gazing at) the IoT devices 160 or markers associated with the IoT devices 160 using the AR cameras $110_1$ through $110_N$.

Figure 2:
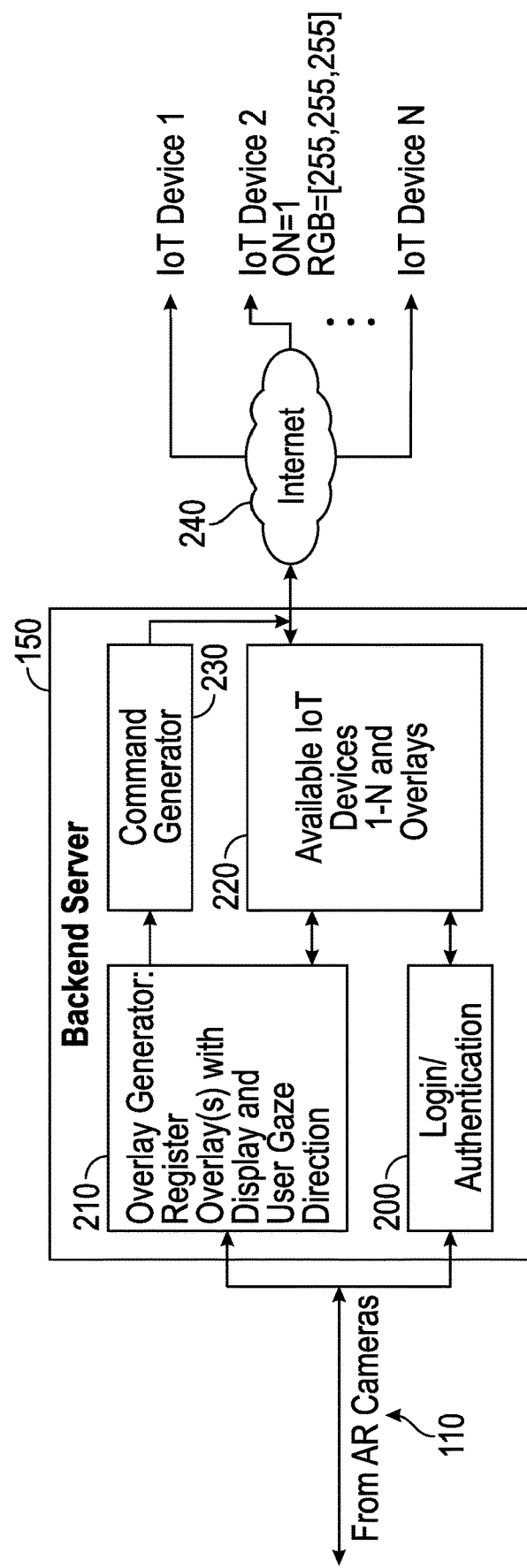
FIG. 2 illustrates a block diagram of a configuration of the backend server of the system of FIG. 1.

FIG. 2 illustrates a block diagram of a configuration of the backend server 150 of the system of FIG. 1. As illustrated, the backend server 150 receives inputs from the AR cameras $110_1$ through $110_N$. The respective inputs may be provided to login/authentication module 200 for logging the respective users of the AR cameras $110_1$ through $110_N$ into the system or for pairing/authenticating the respective AR cameras $110_1$ through $110_N$ with available IoT devices 160 having connection information and associated interactable overlays stored in IoT memory 220. On the other hand, inputs including information indicative of the gaze direction (e.g., reticle position) may be provided to an overlay generator 210 that registers the interactable overlays associated with IoT devices 160 from IoT memory 220 with markers in the image viewed by the user. In particular, an interactable overlay is assigned to each IoT device 160 and digital contents for controlling the IoT device 160 are anchored to the interactable overlay. For example, if the interactable overlay includes an "ON" button and an "OFF" button, the digital contents may indicate the IP address of the associated IoT device 160 and an indicator of the actions to be taken in response to selection of the respective buttons, in this case, turning on or off the associated IoT device 160. The interactable overlay image, once overlaid on the image of the scene including the associated IoT device 160 may act as a visual marker for activation of the associated IoT device 160 upon selection of the visual marker.

In a sample configuration, the AR processing 140 may use dynamic marker tracking in the displayed image using global or local coordinates to identify the IoT devices 160 in the displayed image and to map the respective markers in the user's environment relative to the user's AR camera $110_1$ through $110_N$. The IoT devices 160 in the user's environment then may be dynamically tracked as the AR camera $110_1$ through $110_N$ is moved throughout the user's environment. Optionally, the user's mobile device or electronic eyewear device including the AR camera 110 may communicate directly with the identified IoT devices 160 using BLUETOOTH® or other wideband communications technologies.

As explained below with respect to FIG. 7, the interactable overlays may be provided with the IoT device 160 or may be created using a Lens studio or a comparable software package that the user may use to create her own interactable overlay designs. For example, the interactable overlay may identify the IoT device 160 using text or a preselected image that is included in the interactable overlay design and may include instructions in the form of text notifying the user of what input action to take (e.g., what prompt or verbal cue to say to voice activate the IoT device 160 where the corresponding audio is processed by software $130_1$ through $130_N$ of the AR camera $110_1$ through $110_N$ or the backend server 150 to identify the voice command). Once the user of an AR camera $110_1$ through $110_N$ is logged into the system and the pairing function has been completed, the respective inputs from the AR cameras $110_1$ through $110_N$ are provided to the overlay generator 210 for tracking the fixation point of the AR cameras $110_1$ through $110_N$ relative to the interactable overlays registered with markers in the image viewed by the user.

In sample configurations, the IoT memory 220 stores interface elements that are displayed as an interactable overlay on the displayed image when the users of the AR cameras $110_1$ through $110_N$ are pointing an AR camera 110 in the direction of an IoT device 160. Then, when the user of the AR camera points the AR camera 110 so as to interact with the overlaid interface elements (e.g., by gazing at the overlaid interface element when wearing an electronic eyewear device with an integrated AR camera 110), the backend server 150 takes the actions associated with the respective overlaid interface elements. The backend server 150 thus identifies the IoT device(s) 160 and the requested actions, and the command generator 230 generates the corresponding commands to be sent to the identified IoT device(s) 160 via the Internet 240 for initiating the desired action by the identified IoT device(s) 160.

In the example illustrated in FIG. 2, the AR processing 140 provides AR camera direction information to the overlay generator 210 for determining whether the AR camera is interacting with the interactable overlay overlaid onto the scene captured by the AR cameras $110_1$ through $110_N$ for a particular IoT device 160. If so, the identification of the interactable overlay that has been viewed is provided to the command generator 230. If the interactable overlay is viewed for a predetermined period of time (e.g., waiting period), or if the user provides a tap input or other selection while the interactable overlay is being viewed, then the command generator 230 generates a command associated with the interactable overlay and the corresponding IoT device control signals are routed to the associated IoT device 160 via the Internet 240. In the example of FIG. 2, if the IoT device 160 is a lamp, the control signal may indicate that the IoT device is to be turned on (ON=1) with RGB values RGB=[255,255,255].

Figure 3:
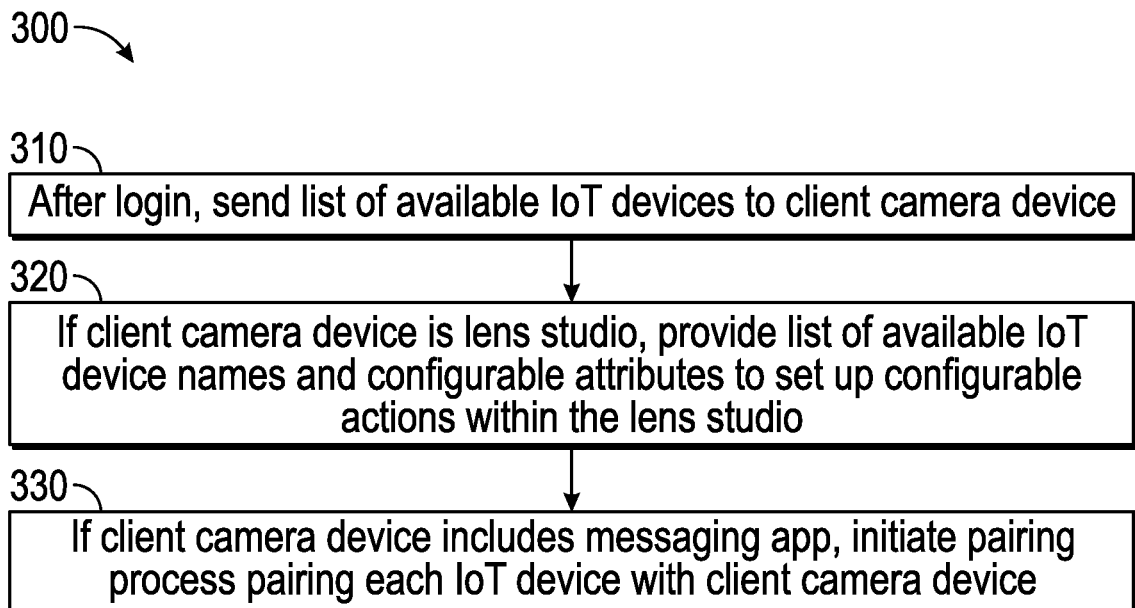
FIG. 3 illustrates a flow chart of a method for pairing an AR camera to IoT devices.

FIG. 3 illustrates a flow chart of a method 300 for pairing an AR camera $110_1$ through $110_N$ to IoT devices 160 in sample configurations. After the user logs into the backend server 150 by providing login information to login/authentication module 200, a list of available IoT devices from IoT memory 220 is provided to the AR camera $110_1$ through $110_N$ for selection at 310. If the AR camera $110_1$ through $110_N$ includes AR software for building AR experiences (e.g., Lens Studio by Snap, Inc., of Santa Monica, Calif.), a list of available IoT device names and configurable attributes are provided to the AR software at 320 to enable the user to set up configurable actions. By providing this information to the AR software (e.g., Lens Studio), lenses may be paired with IoT devices 160 whereby lenses may be interacted with by the user to control IoT devices 160 and outputs of IoT devices 160 may be used to select lenses for presentation on the user's AR camera $110_1$ through $110_N$. On the other hand, if the AR camera $110_1$ through $110_N$ includes a messaging app such as SNAPCHAT® available from Snap, Inc. of Santa Monica, Calif., which provides AR functionality on a smartphone or computer, for example, a pairing process is initiated at 330 for pairing selected IoT devices 160 with AR camera 110. The pairing process allows the user to specify which AR features of the AR camera 110 may control which IoT devices 160 and vice-versa.

Figure 4:
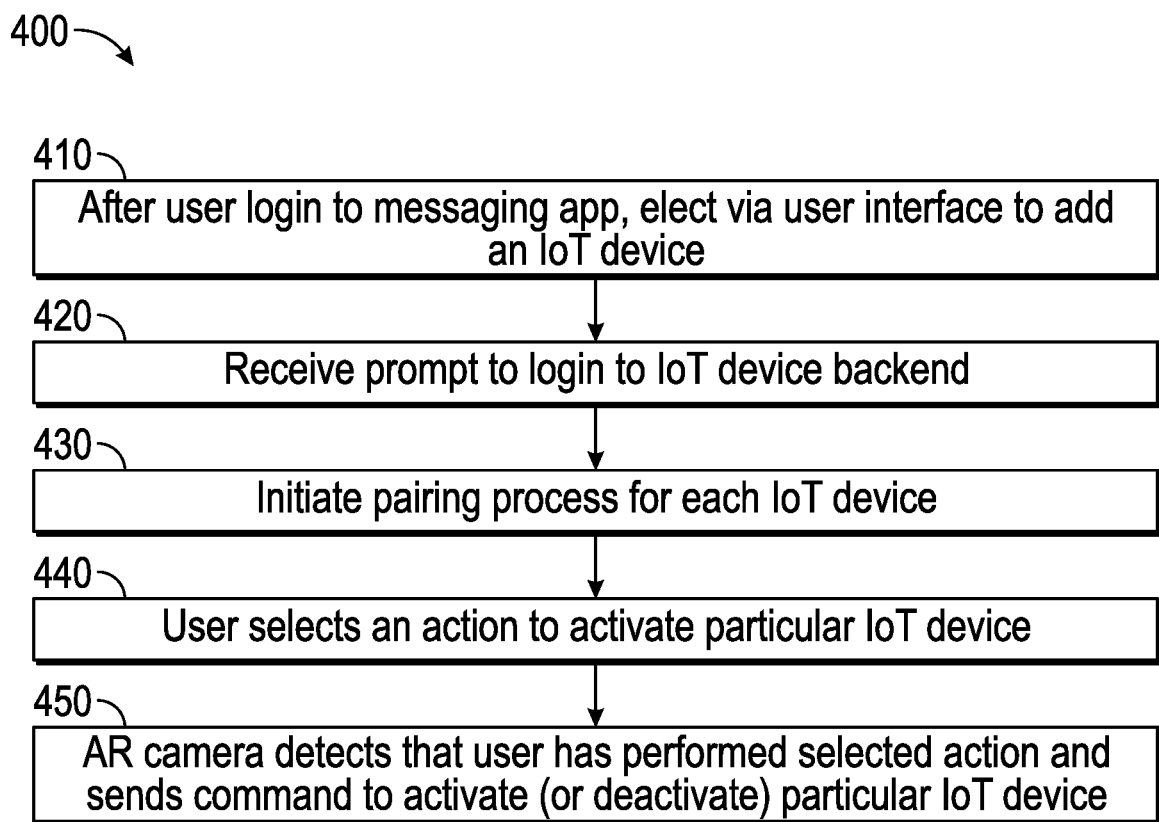
FIG. 4 illustrates a flow chart of a method for pairing a messaging app of an AR camera to IoT devices.

FIG. 4 illustrates a flow chart of a method 400 for pairing a messaging app of an AR camera 110 to IoT devices 160. As illustrated, after the user logs into the messaging app, the user may elect via a user interface at 410 to add an IoT device 160. The user then receives a prompt at 420 to log into the backend server 150. Upon successful login, the pairing process for each selected IoT device is initiated at 430. As part of this pairing process, the user may further select at 440 an action that is to be used to activate a particular IoT device 160 upon interaction with the interactable overlay associated with the particular IoT device 160. For example, an AR display interactable overlay may provide a virtual "ON" display button and a virtual "OFF" display button (see FIG. 9) that may be visually or manually selected to turn "ON" or "OFF" a corresponding IoT device 160. During use, when the AR camera $110_1$ through $110_N$ detects at 450 that the user has performed the selected action (e.g., visually selected the virtual "ON" display button by viewing the virtual "ON" button of the interactable overlay for a predetermined amount of time), then a request including the corresponding action identifier is sent to the command generator 230 to send a command via the internet 240 to activate (or deactivate) the corresponding IoT device 160.

In sample configurations, the IoT devices 160 are paired with AR cameras $110_1$ through $110_N$ via pairing software including a middleware application running in the login/authentication module 200 of the backend server 150. The middleware application assists with login/authentication of the AR camera client $110_1$ through $110_N$ to the IoT devices 160. After login, the middleware application sends a list of all available IoT devices 160 to the AR cameras 110$_1$ through 110$_N$. If the user's AR camera 110 includes a Lens Studio, the user will receive a list of available device names and configurable attributes for the available IoT devices 160 so that the user may associate configurable actions within respective lenses that are to be used as the interactable overlays. On the other hand, if the user's AR camera 110 instead includes a messaging app such as SNAPCHAT® available from Snap, Inc. of Santa Monica, Calif., the user may go through a pairing process whereby each IoT device 160 can pair, one device at a time, with the messaging app (e.g., Snap Camera in the case of SNAPCHAT® or SPECTACLES™ available from Snap, Inc., etc.) by pointing the AR camera 110 at the IoT device 160 in the user's environment, which will be activated one at a time via some visual (e.g., blinking a bulb), auditory (e.g., playing a sound), or other cue. The AR camera 110 will know the current GPS coordinates, general visual features in the scene, and information from the accelerometer and will show a confirmation dialog for each paired IoT object 160.

When the user logs in to her messaging app account, the user may select an IoT device 160 by tapping on the user interface of the messaging app on the AR camera 110$_1$ through 110$_N$. The user also may receive a prompt to log in to her IoT device backend server 150 to initiate the pairing process for each IoT device 160. Once paired, the user is able to select an action to activate the paired IoT device 160. For example, an "ON" button interactable overlay may turn "ON" the paired IoT device 160, while an "OFF" button interactable overlay may turn "OFF" the paired IoT device 160. During use, the paired IoT device 160 is activated or deactivated when the user performs the corresponding action that was selected during the pairing process (e.g., view the "ON" button interactable overlay or the "OFF" button interactable overlay).

Figure 5:
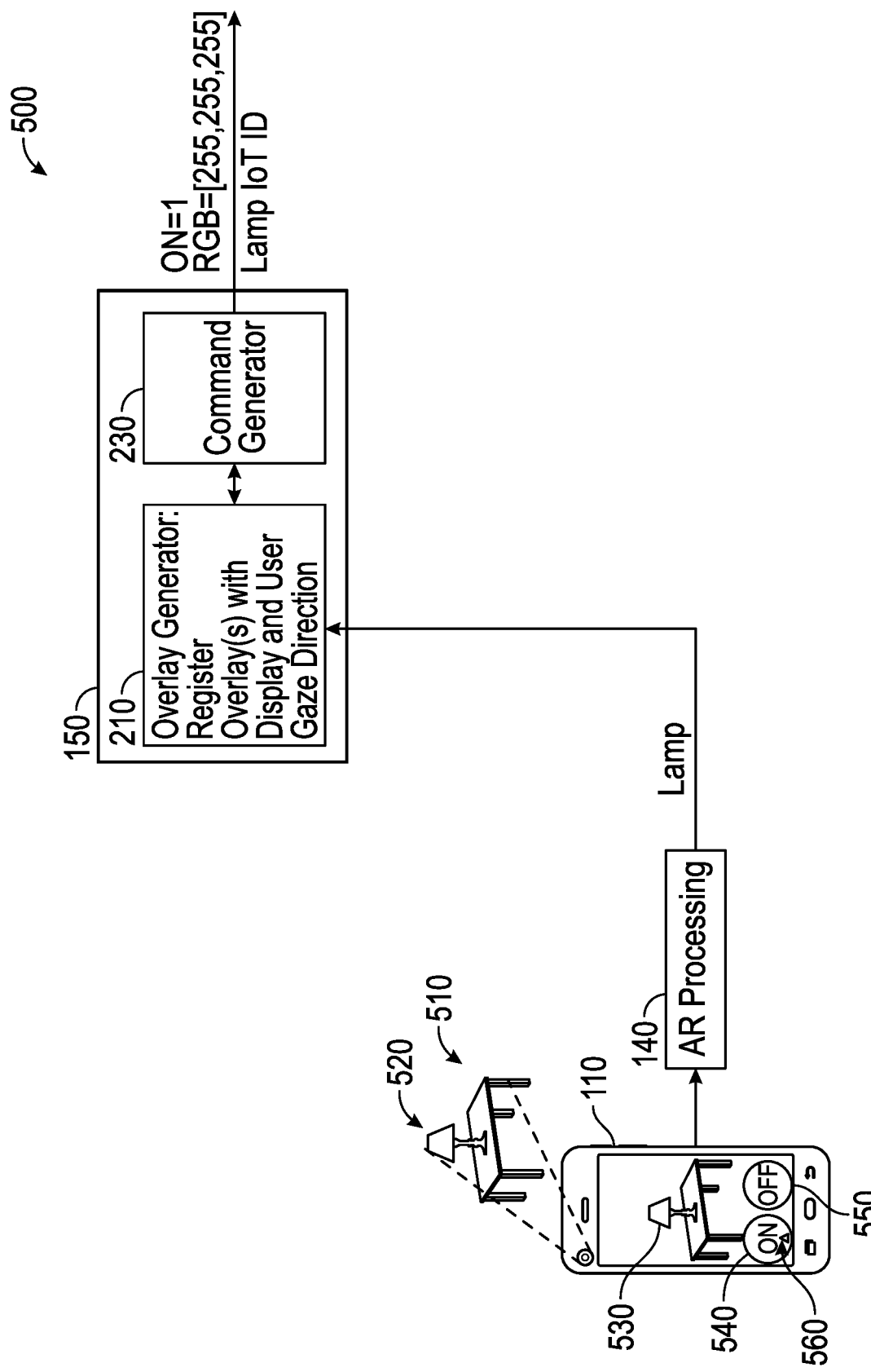
FIG. 5 illustrates a system for enabling a user of an AR camera to control IoT devices in a sample configuration.

FIG. 5 illustrates a system 500 for enabling a user of an AR camera 110 to control IoT devices 160 in a sample configuration. In this example, the IoT device 160 to be controlled by the "ON" command is determined by the AR camera 110 detecting in the scene 510 an IoT object such as a lamp 520 and determining the IoT identity of lamp 520 from context information (e.g., GPS location data). The user's AR camera 110 also may scan the scene 510 to identify any selectable IoT devices such as the lamp 520 and to display an image of the captured lamp 520 as image 530 on a display of the user's AR camera 110. The captured image is processed by AR processing 140 to establish that the captured image 520 is a lamp having a known IoT identification. The IoT identification of the lamp 520 is provided to the backend server 150 to determine if the identified lamp 520 is an available IoT device 160 for the user. If so, the overlay generator 210 may pull up the AR interactable overlay associated with the identified IoT device 160 including, for example, the "ON" button 540 and the "OFF" button 550 for the identified lamp 520 for presentation on the display of the AR camera 110. A reticle 560 also may be generated for presentation over the captured scene 510 to pinpoint where the AR camera 110 is pointing in space (i.e., the focal point of the AR camera 110). In the case of an electronic eyewear device including the AR camera 110, the reticle 560 may follow the head movement of the user. When the reticle 560 is positioned over the "ON" button 540 as illustrated for a predetermined period of time, the overlay generator 210 recognizes that the user is selecting the "ON" button 540 for the lamp 520 within the scene 510 and sends data to command generator 230 indicating that the "ON" button 540 for lamp 520 has been selected by the user. The command generator 230 generates the corresponding command for turning on the lamp 520. In this case, a signal ON=1 and RGB=[255,255,255] is sent via the internet 240 to the lamp 520 to turn on the lamp 520. This process may be repeated for each IoT device in the field of view of the AR camera 110.

As another example, instead of pointing the user's AR camera 110 at the "ON" button 540 of the interactable overlay for a period of time to activate the lamp 520, the user's AR camera 110 may detect that the user has provided a verbal message to the AR camera 110 such as "turn ON" or a particular gesture or button tap that is interpreted by the overlay generator 210 to indicate a selection while the reticle 560 is positioned over the "ON" button 540. Thus, when AR camera 110 is pointed at an IoT device 160 such as lamp 520 and the reticle 560 of the AR camera selects the "ON" button 540 of the interactable overlay, the lamp 520 may be activated by maintaining the reticle 560 over the "ON" button 540 for the predetermined period of time or by providing a verbal message, gesture, or physical button selection on the AR camera 110 while the reticle 560 is over the "ON" button 540, thus indicating that the user wishes to turn on the lamp 520. The interactable "ON" button 540 or the interactable "OFF" button 550 may be animated once selected to change color or to initiate some other type of animation as desired. If the lamp 520 is recognized by the AR processing system 140 and backend server 150 as an IoT device 160 to which the user's AR camera 110 has been paired, the backend server 150 would recognize the selection and the command generator 230 would generate the associated command to turn on the lamp 520. The backend server 150 may optionally instruct the lamp 520 to flash to verify to the user that the lamp 520 has been recognized as the IoT device 160 to be controlled.

In the case where the AR camera 110 is mounted in an AR enabled eyewear device such as SPECTACLES™ available from Snap, Inc. of Santa Monica, Calif., the wearer of the AR enabled eyewear device may scan the scene 510 with the AR camera 110 to recognize any IoT enabled devices in the room. The interactable overlay for the recognized IoT enabled devices 160 may be presented to the display of the AR camera 110 as the IoT enabled device 160 corresponding to each interactable overlay is recognized in the scene 510. The wearer may then selectively activate the IoT enabled devices 160 in the scene 510 by pointing the AR camera 110 at the interactable overlays for each IoT enabled device 160 (e.g., by gazing) or by providing a verbal message, gesture, or physical button selection on the AR camera 110 while viewing the interactable overlay as noted above. Thus, when several IoT devices 160 are identified in the room scan, the interactable overlays for the recognized IoT devices 160 may be presented to the display of the AR enabled eyewear for user selection to turn ON or OFF.

Figure 6:
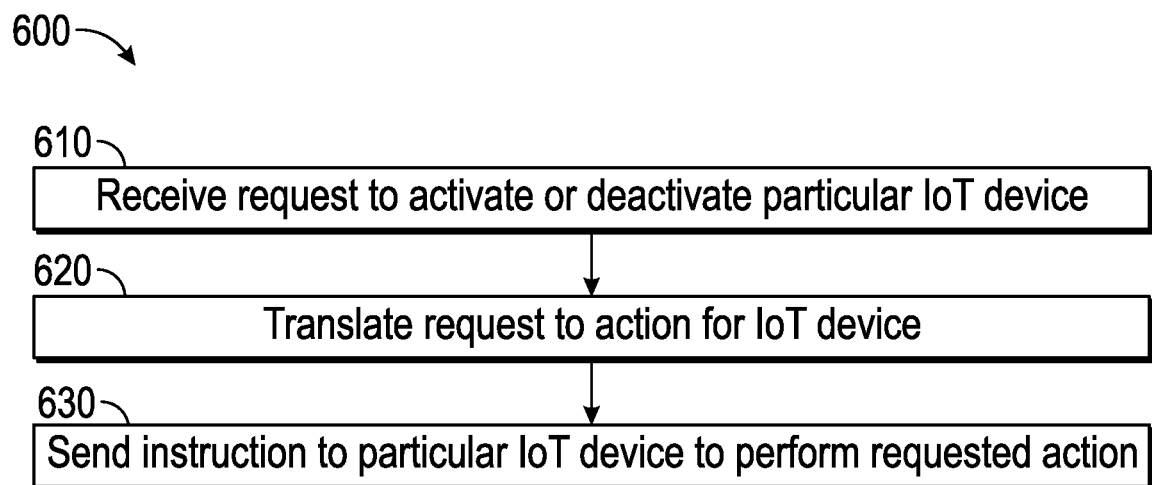
FIG. 6 illustrates a flow chart of a method implemented by the backend server for enabling a user of an AR camera to control IoT devices in the configuration of FIG. 5.

FIG. 6 illustrates a flow chart of a method 600 implemented by the backend server 150 for enabling a user of an AR camera 110 to control IoT devices 160 in the configuration of FIG. 5. In this configuration, the backend server 150 receives a request at 610 to activate or deactivate particular IoT devices 160 in accordance with an action identifier identifying the action selected by the AR camera 110. As noted above, the particular IoT device(s) 160 may be determined by scanning the room to identify IoT devices 160, pointing to and identifying a particular IoT device 160, pairing the AR camera 110 to a particular IoT device 160, etc. The action identifier may be determined by pointing the AR camera 110 at the interactable overlay image for the respective IoT devices 160, and capturing and processing the user's voice, gestures, taps, and the like indicative of the user's selection of the action represented by the interactable overlay image. At 620, the received request including the action identifier is translated to a recognized action for the IoT device(s) 160 by the overlay generator 210. At 630, the instruction for the requested action is sent to the particular IoT device(s) 160 to perform the requested action. In the example of FIGS. 2 and 5, a signal of ON=1 and RGB= [255,255,255] is sent to the IoT enabled lamp 520 at the address provided by IoT device memory 220.

Figure 7:
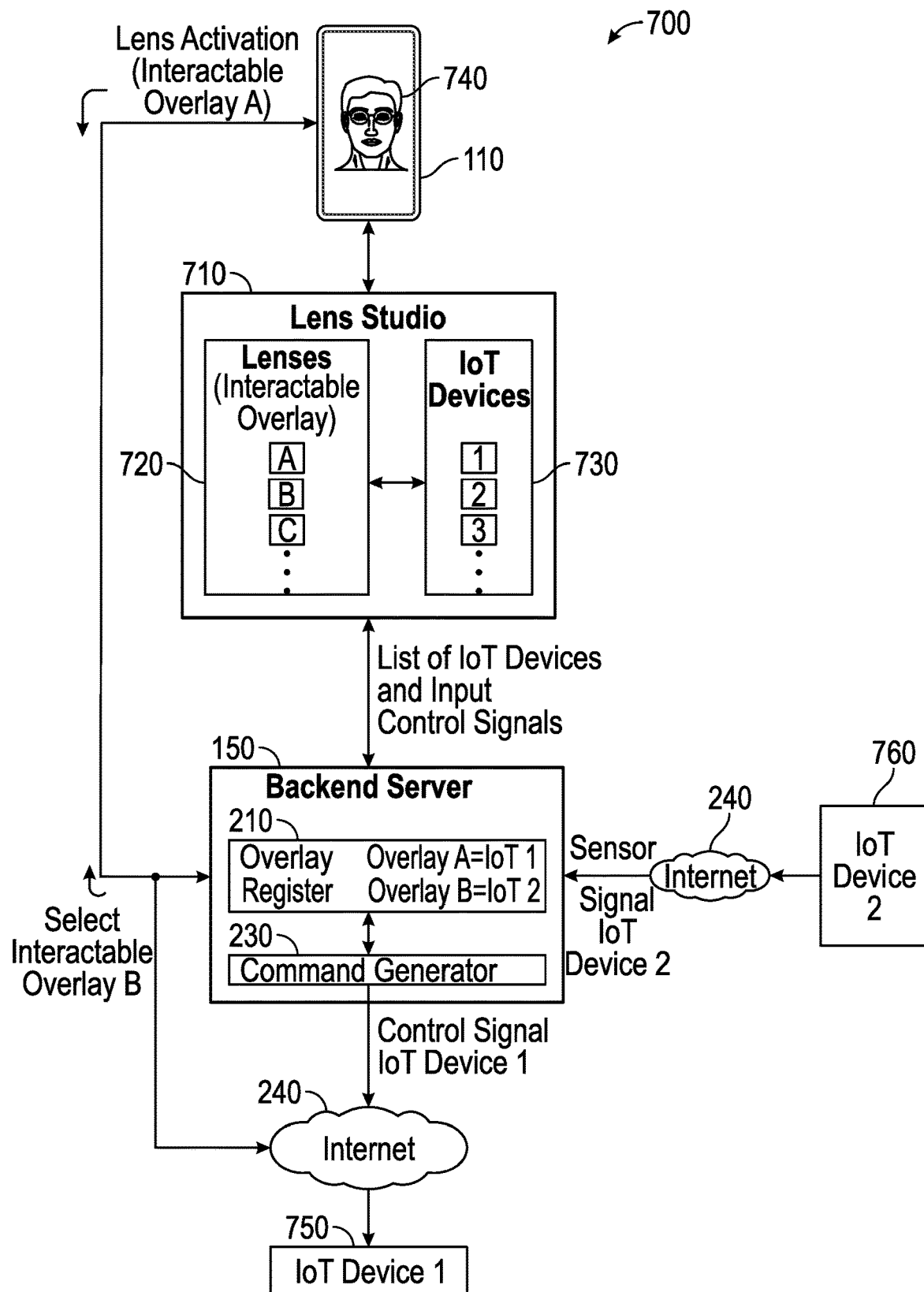
FIG. 7 illustrates a system for relating AR lenses to IoT devices using AR software for building augmented reality experiences in a sample configuration.

FIG. 7 illustrates a system 700 for relating AR lenses 720 to IoT devices 730 using AR software 710 for building augmented reality experiences in a sample configuration. In this example, a service is provided that would permit developers to develop AR lenses 720 as interactable overlays for display on the AR display of the user's AR camera 110 for use in controlling IoT devices 730 in their environment as described herein.

As illustrated in FIG. 7, AR software 710 for building AR experiences (e.g., Lens Studio by Snap, Inc. of Santa Monica, Calif.) is provided that lists available lenses 720 in the form of interactable overlays as well as available IoT devices 730 that may be controlled by the user via the user's AR camera 110. The user may select lenses 720 (interactable overlays) for controlling selected IoT devices 730 and may select IoT devices 730 for selecting lenses 720 (interactable overlays) in sample configurations. During use of the AR camera 110, activation of a displayed interactable overlay (A) 740 may cause a control signal function assigned to the displayed interactable overlay 740 to be provided to the backend server 150 for controlling the IoT device(s) 750 as paired with the selected interactable overlay 740 by the user. The control signal for the function assigned to the interactable overlay 740 may be provided directly to the IoT device 750 by the AR camera 110 or may be determined by overlay generator 210, which may maintain a list of lenses (interactable overlays) 720 and IoT devices 730 controlled by the respective lenses (interactable overlays) 720 and the respective control signals assigned to the lenses (interactable overlays) 720. Upon activation of the interactable overlay 740, the corresponding control signal is forwarded to the corresponding IoT device 750 via an internet connection 240 directly or via backend server 150.

As an example, an AR object in the form of an overlay image of virtual buttons for selection is paired with the lamp 520 of FIG. 5 and overlaid on the display of the AR camera 110 when the IoT controlled lamp 520 of FIG. 5 appears on the display. Similarly, an IoT device 760 may provide a sensor signal via an internet connection 240 to the backend server 150, where overlay generator 210 identifies the corresponding lens (interactable overlay) 720. The backend server 150 then sends a control signal to at least one of the AR software 710 or the user's AR camera 110 to select the interactable overlay (B) 720 that has been paired with the IoT device 760 that provided the sensor signal.

Figure 8:
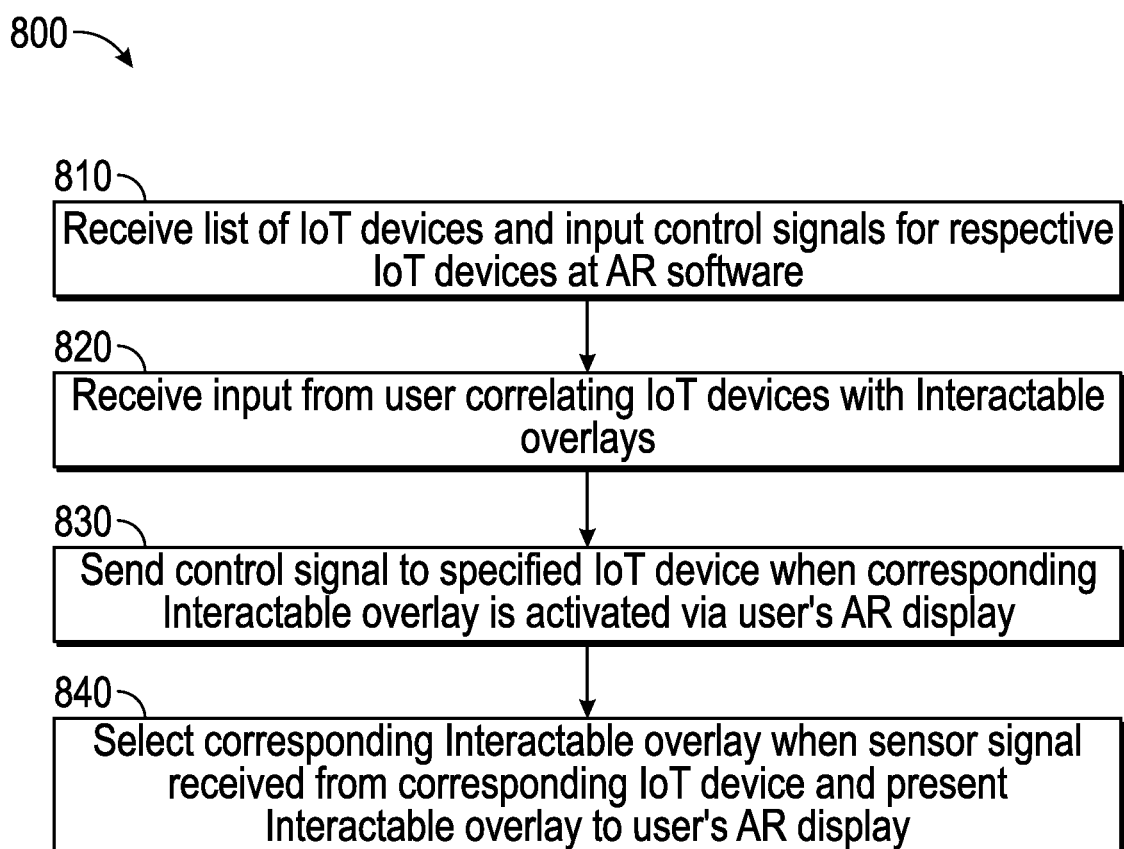
FIG. 8 illustrates a flow chart of a method implemented by the AR camera and AR software for selecting lenses using an IoT device and for controlling an IoT device using a lens in the configuration of FIG. 7.

FIG. 8 illustrates a flow chart of a method 800 implemented by the AR camera 110 and AR software 710 for selecting interactable overlays 720 using an IoT device 730 and controlling the IoT device 730 using an interactable overlay 720 in the configuration of FIG. 7. As illustrated, the AR software 710 (e.g., Lens Studio) receives a list of IoT devices 730 and input control signals at 810 for the respective IoT devices 730 to be paired with interactable overlays 720. At 820, the user provides input to the AR software 710 for correlating the IoT devices 730 to interactable overlays 720 when creating an AR experience. Then, when an interactable 720 paired with an IoT device 730 is activated by gazing at the interactable 720 for a predetermined period of time, or by providing a selection by the user's voice, gestures, taps, and the like indicative of the user's selection of the action represented by the interactable overlay 720, a control signal is sent at 830 to the paired IoT device 730 either directly or via the backend server 150. Conversely, when a sensor signal is received from an IoT device 730 by the backend server 150, a selection signal may be sent to the AR camera 110 for selection of the interactable overlay 720 paired with the IoT device 730 that provided the sensor signal. The selected interactable overlay 720 is then presented to the user's AR display at 840.

FIGS. 9A-9F illustrate screen shots of sample interactable overlays for controlling IoT objects in sample configurations.

Figure 9A:
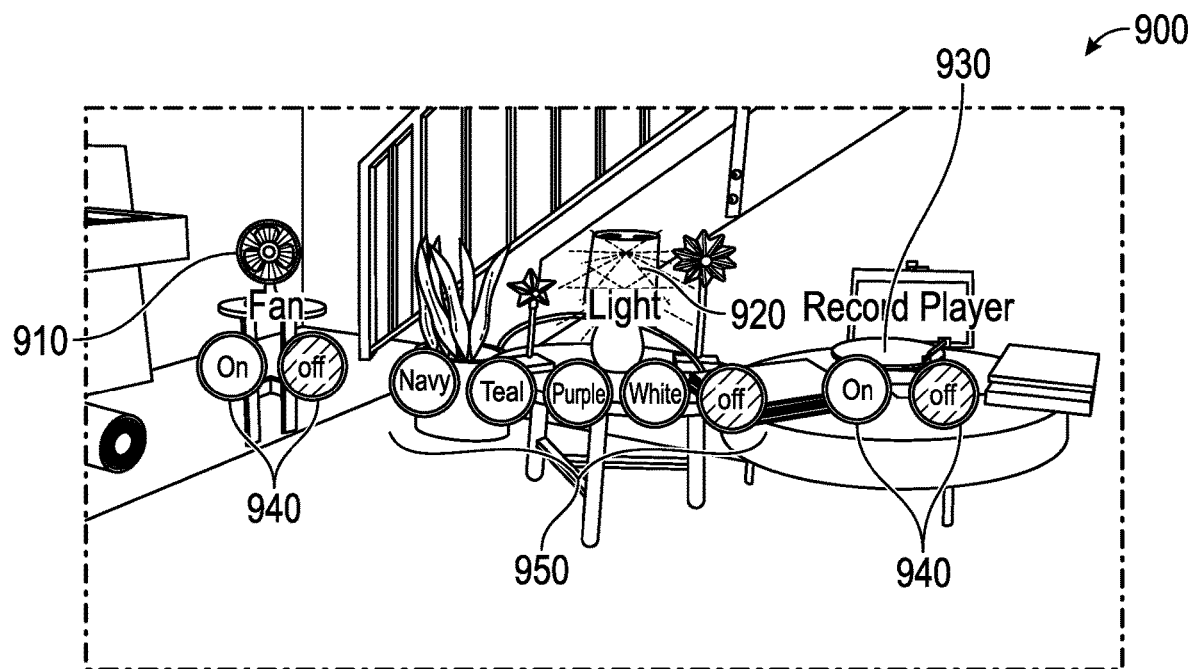
FIGS. 9A-9F illustrate screen shots of interfaces for controlling IoT objects in sample configurations.

FIG. 9A illustrates a scan of a scene 900 including an IoT controlled fan 910, an IoT controlled light 920, and an IoT controlled record player 930. As illustrated, the AR processing 140 has recognized IoT devices 910-930 as an IoT controlled fan, light, and record player, respectively, and provides the IoT device address for each IoT controlled device 910-930 to overlay generator 210 of backend server 150, which uses the IoT device address information to select a corresponding interactable overlay image. For example, as shown in FIG. 9A, a first interactable overlay 940 may include "ON" and "OFF" buttons for turning on and off the IoT controlled fan 910 and the IoT controlled record player 930, while a second interactable overlay 950 may include a plurality of options including, for example, different colors for the associated IoT controlled lamp 920.

Figure 9B:
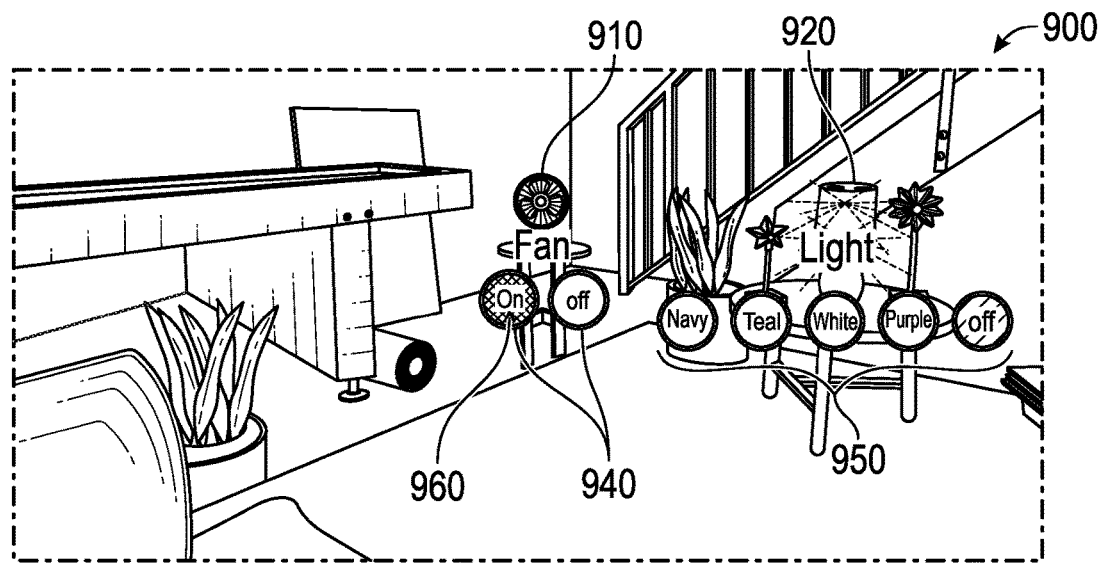

As shown in FIG. 9B, user interaction with the interactable overlay images 940 or 950 may cause the generation of a control signal for controlling the associated IoT device 910-930. For example, in FIG. 9B, the AR camera 110 is pointed at the virtual "ON" button of the interactable overlay 940, which causes the virtual "ON" button of the interactable overlay 940 to be selected. As indicated, a reticle 960 provides feedback to the user of the AR camera 110 as to what is the focal point of the AR camera 110 for selection purposes. To turn on the associated IoT controlled fan 910, the reticle 960 is maintained over the virtual "ON" button of the interactable overlay 940 for a predetermined period of time (e.g., 1-2 seconds) or the user makes a selection while the reticle 960 is disposed over the virtual "ON" button of the interactable overlay 940. As noted above, the selection may be made by the user's voice, gestures, taps, and the like indicative of the user's selection of the action represented by the interactable overlay 940. By moving the reticle 960 of the AR camera 110 to the virtual "OFF" button of the interactable overlay 940, the user may similarly elect to turn off the IoT controlled fan 910.

Figure 9C:
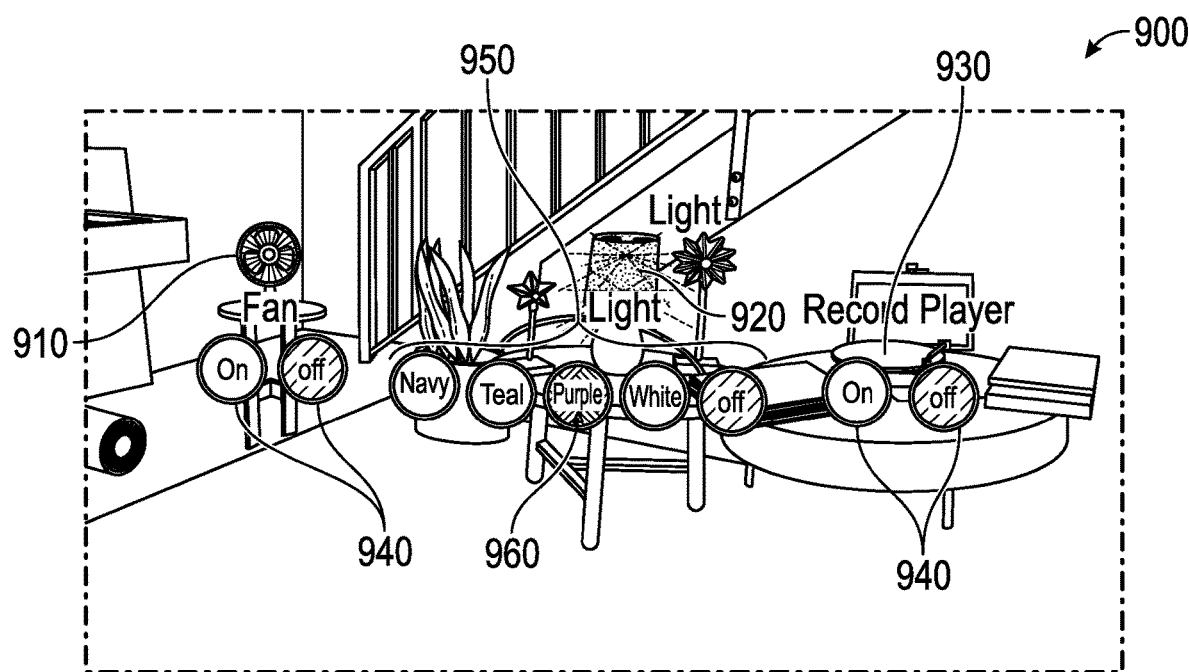

FIG. 9C illustrates that the user has now repositioned the reticle 960 on the purple color option of the interactable overlay 950. In this case, selection of the purple color option of the interactable overlay 950 causes a command to be sent to the IoT controlled lamp 920 to turn on the purple light of the lamp 920. For example, the RGB control signal sent to the IoT controlled lamp 920 may be RGB=[255,0,255] for purple. The color of the lamp 920 may be changed by similarly selecting one of the other color options in the respective circles of the interactable overlay 950 and sending the corresponding control signal.

Figure 9D:
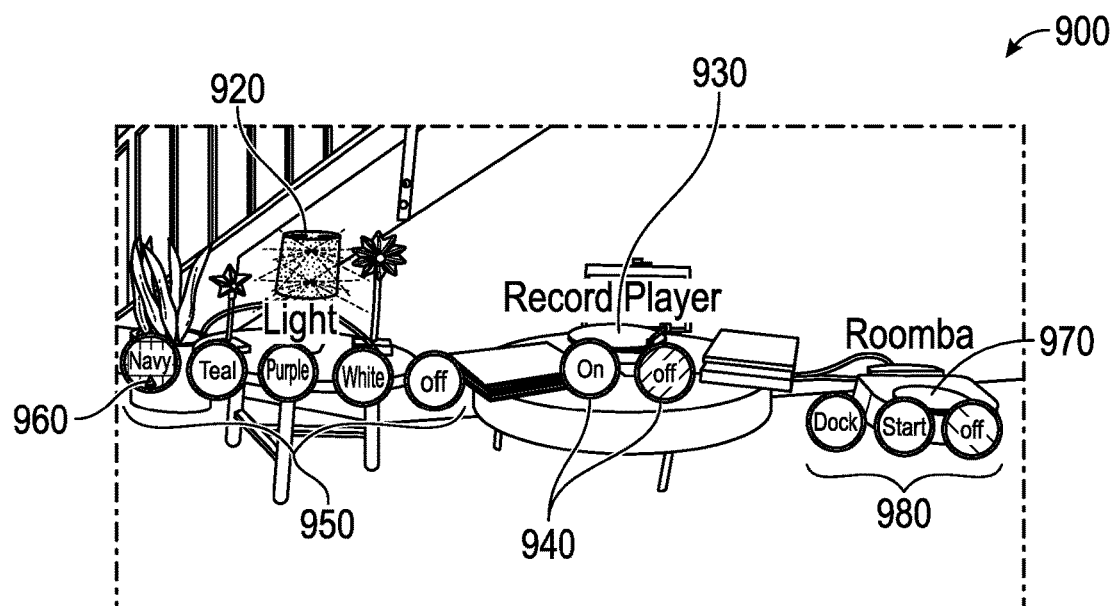

FIG. 9D illustrates more of the scene 900 including the IoT controlled floor cleaning robot device 970 and its corresponding interactable overlay 980 including virtual control buttons for turning on and off and for docking the IoT controlled floor cleaning robot device 970. As illustrated by reticle 960, the AR camera 110 has been moved to focus on the blue color option of the interactable overlay 950, and the IoT controlled lamp 920 is in the process of transitioning from purple to blue.

Figure 9E:
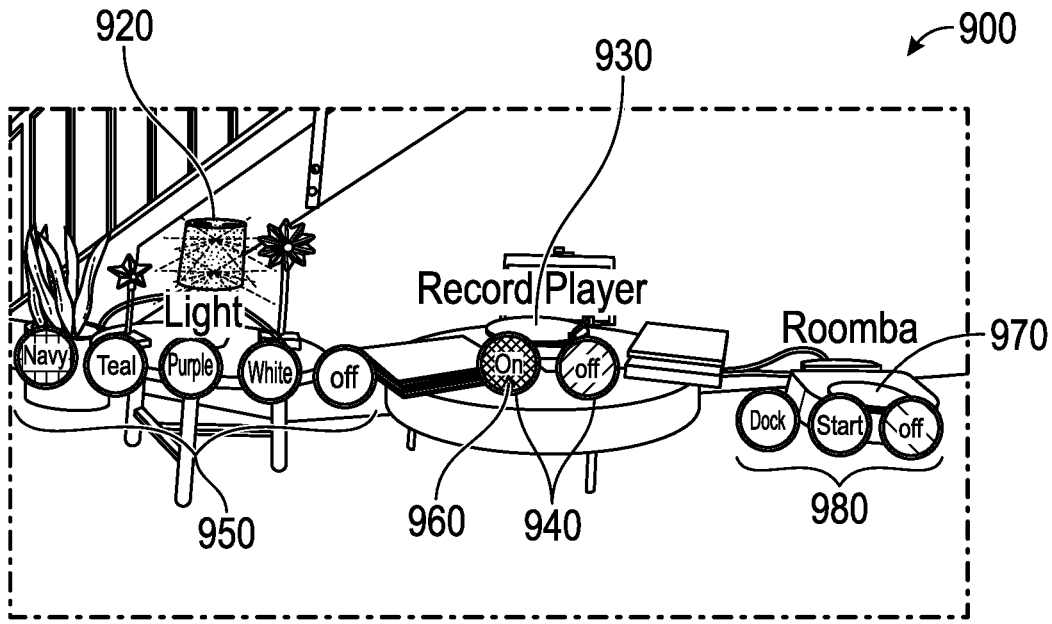

FIG. 9E illustrates scene 900 where the AR camera 110 has been moved so that the reticle 960 is now selecting the virtual "ON" button of the interactable overlay 940 of the IoT controlled record player 930 for turning on the IoT controlled record player 930. As indicated, the blue color option of the interactable overlay 950 remains on since the user did not turn off the light 920 before moving the AR camera 110 to the record player 930.

Figure 9F:
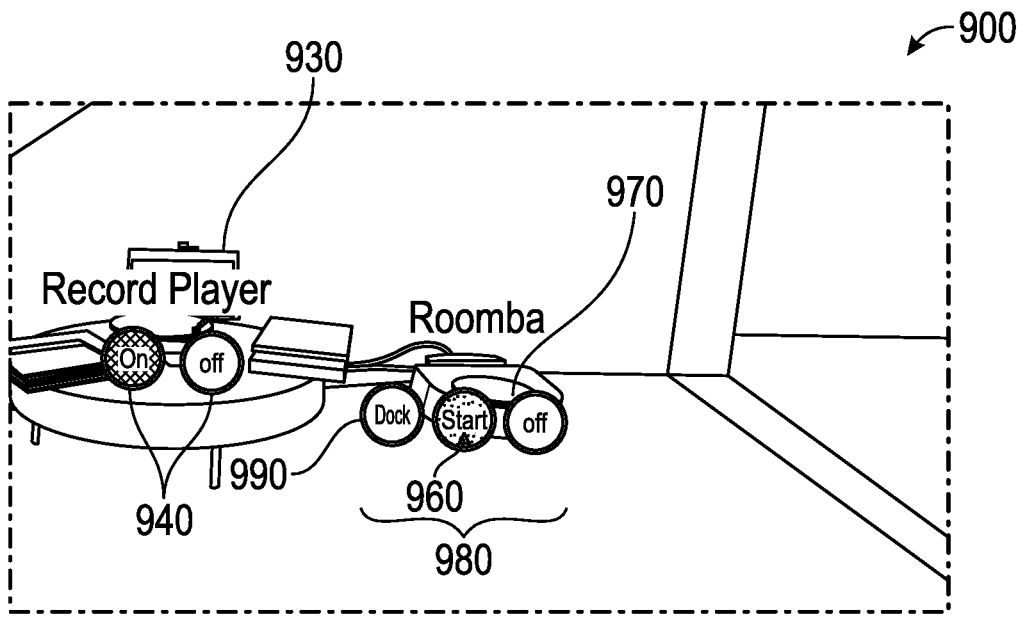

FIG. 9F illustrates scene 900 where the AR camera 110 has been moved so that the reticle 960 is now selecting the virtual "ON" button of the interactable overlay 980 of the IoT controlled floor cleaning robot device 970. In this example, the IoT controlled floor cleaning robot device 970 has been turned on and has left its cradle. The IoT controlled floor cleaning robot device 970 may be redocked by selecting the "dock" button 990 of the interactable overlay 980.

In this fashion, the AR camera 110 may function as a universal visual remote for controlling IoT devices. It will be appreciated that each of the control operations described herein could be performed by simply pointing an AR camera 110 of a mobile device or an electronic eyewear device at the respective IoT devices. Alternatively, in the configuration where the AR camera 110 is incorporated into electronic eyewear, the eye direction of the user may be tracked to identify the direction of the user's gaze for selection of the interactable overlay elements as described herein. Such devices are particularly useful for users with physical disabilities.

System Configuration

Figure 10:
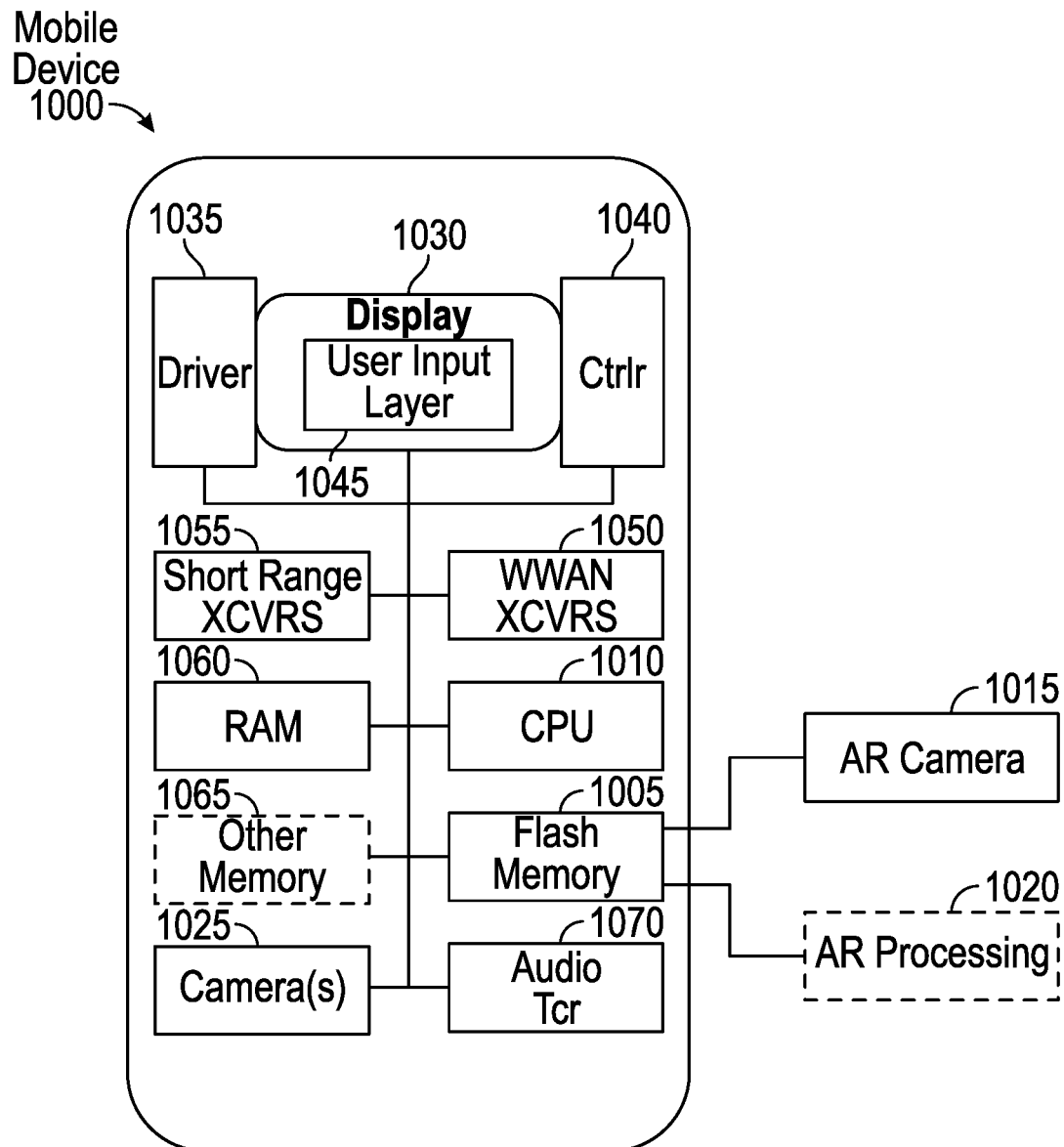
FIG. 10 illustrates a sample configuration of a mobile phone adapted to operate as an AR camera in sample configurations.

FIG. 10 illustrates a sample configuration of a mobile device 1000 adapted to interface an AR camera 1015 with IoT devices in sample configurations. In particular, FIG. 10 is a high-level functional block diagram of an example mobile device 1000 that a user may use as one of the AR cameras 110 described herein. Mobile device 1000 may include a flash memory 1005 that stores programming to be executed by the CPU 1010 to perform all or a subset of the functions described herein. For example, the flash memory may store AR camera software 1015 and optionally may contain AR processing software 1020 for execution by CPU 1010 to enable the user of the mobile device 1000 to display and interact with AR interactable overlays presented by the AR camera 110 as described herein. The mobile device 1000 may further include a camera 1025 that comprises one or more visible-light cameras (first and second visible-light cameras with overlapping fields of view) or at least one visible-light camera and a depth sensor with substantially overlapping fields of view. Flash memory 1005 may further include multiple images or video, which are generated via the camera 1025.

The mobile device 1000 may further include an image display 1030, a mobile display driver 1035 to control the image display 1030, and a display controller 1040. In the example of FIG. 10, the image display 1030 may include a user input layer 1045 (e.g., a touchscreen) that is layered on top of or otherwise integrated into the screen used by the image display 1030. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 10 therefore provides a block diagram illustration of the example mobile device 1000 with a user interface that includes a touchscreen input layer 1045 for receiving input (by touch, multi-touch, or gesture, and the like, by hand, stylus, or other tool) and an image display 1030 for displaying content.

As shown in FIG. 10, the mobile device 1000 includes at least one digital transceiver (XCVR) 1050, shown as WWAN XCVRs, for digital wireless communications via a wide-area wireless mobile communication network. The mobile device 1000 also may include additional digital or analog transceivers, such as short-range transceivers (XCVRs) 1055 for short-range network communication, such as via NFC, VLC, DECT, ZigBee, Bluetooth™, or WI-FI®. For example, short range XCVRs 1055 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 1000, the mobile device 1000 also may include a global positioning system (GPS) receiver. Alternatively, or additionally, the mobile device 1000 may utilize either or both the short range XCVRs 1055 and WWAN XCVRs 1050 for generating location coordinates for positioning. For example, cellular network, WI-FI®, or BLUETOOTH® based positioning systems may generate very accurate location coordinates, particularly when used in combination. Such location coordinates may be transmitted to the mobile device 1000 over one or more network connections via XCVRs 1050, 1055.

The transceivers 1050, 1055 (i.e., the network communication interface) may conform to one or more of the various digital wireless communication standards utilized by modern mobile networks. Examples of WWAN transceivers 1050 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 1050, 1055 provide two-way wireless communication of information including digitized audio signals, still image and video signals, web page information for display as well as web-related inputs, and various types of mobile message communications to/from the mobile device 1000.

The mobile device 1000 may further include a microprocessor that functions as the central processing unit (CPU) 1010. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 1010. The CPU 1010, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 1010 or processor hardware in smartphone, laptop computer, and tablet.

The CPU 1010 serves as a programmable host controller for the mobile device 1000 by configuring the mobile device 1000 to perform various operations, for example, in accordance with instructions or programming executable by CPU 1010. For example, such operations may include various general operations of the mobile device 1000, as well as operations related to the programming for messaging apps and AR camera applications on the mobile device 1000. Although a processor may be configured by use of hard-wired logic, typical processors in mobile devices are general processing circuits configured by execution of programming.

The mobile device 1000 further includes a memory or storage system, for storing programming and data. In the example shown in FIG. 10, the memory system may include flash memory 1005, a random-access memory (RAM) 1060, and other memory components 1065, as needed. The RAM 1060 may serve as short-term storage for instructions and data being handled by the CPU 1010, e.g., as a working data processing memory. The flash memory 1005 typically provides longer-term storage.

Hence, in the example of mobile device 1000, the flash memory 1005 may be used to store programming or instructions for execution by the CPU 1010. Depending on the type of device, the mobile device 1000 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 1000 may include an audio transceiver 1070 that may receive audio signals from the environment via a microphone (not shown) and provide audio output via a speaker (not shown). Audio signals may be coupled with video signals and other messages by a messaging application or social media application implemented on the mobile device 1000. Also, as noted above, the audio signals may include verbal commands from the user in relation to the IoT devices (e.g., "turn ON lamp").

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
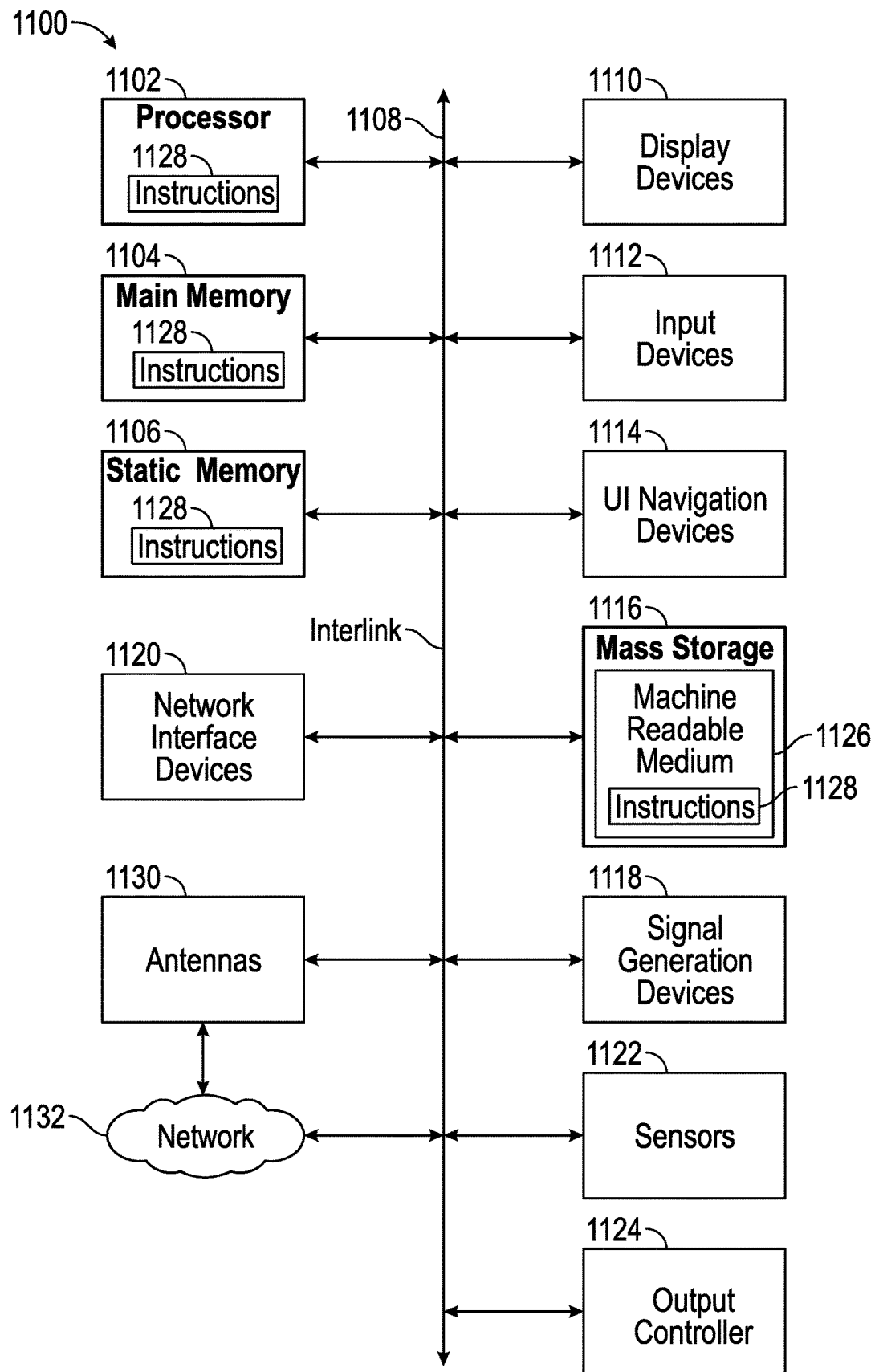
FIG. 11 illustrates a sample configuration of a computer system adapted to implement the backend server systems and methods described herein.

FIG. 11 illustrates a sample configuration of a computer system adapted to implement the systems and methods described herein. In particular, FIG. 11 illustrates a block diagram of an example of a machine 1100 upon which one or more configurations of the AR camera 110, AR processing 140, and backend server 150 may be implemented. In alternative configurations, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample configurations, the machine 1100 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein by running the software used to implement the features for controlling IoT devices as described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 also may include an output controller 1124, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., at least one of a centralized or distributed database, or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling at least one Internet of Things (IoT) device, comprising:
  pairing, by at least one processor upon executing first instructions stored on at least one non-transitory computer readable medium, an interactable augmented reality (AR) overlay with the at least one IoT device, the interactable overlay including control information for generating a control signal for controlling the at least one IoT device when the interactable overlay is interacted with by an AR camera device;
  presenting, by the at least one processor upon executing the first instructions stored on the at least one non-transitory computer readable medium, the interactable overlay on a display of the AR camera device when the at least one IoT device is in a field of view of the AR camera device;
  receiving, by the at least one processor upon executing second instructions stored on the at least one non-transitory computer readable medium, an indication that the user has pointed the AR camera device at the interactable overlay associated with the at least one IoT device on the display of the AR camera device; and
  in response to the indication, sending, by the at least one processor upon executing the second instructions stored on the at least one non-transitory computer readable medium, a control signal associated with the interactable overlay pointed at by the AR camera device to the at least one IoT device that is associated with the interactable overlay pointed at by the AR camera device.

2. The method as in claim 1, wherein receiving the indication that the user has pointed the AR camera device at the interactable overlay associated with the at least one IoT device on the display of the AR camera device includes generating the indication when a user points the AR camera device at the interactable overlay for a predetermined period of time.

3. The method as in claim 1, wherein receiving the indication that the user has pointed the AR camera device at the interactable overlay associated with the at least one IoT device on the display of the AR camera device includes generating the indication when the user provides a selection input to the AR camera device while the AR camera device is pointed at the interactable overlay.

4. The method as in claim 3, wherein the selection input comprises at least one of a predetermined verbal message, a gesture, or a physical button selection on the AR camera device.

5. The method as in claim 4, wherein presenting the interactable overlay includes presenting instructions in the interactable overlay for providing the selection input.

6. The method as in claim 1, wherein presenting the interactable overlay on the display of the AR camera device when the at least one IoT device is in a field of view of the AR camera device comprises overlaying the interactable overlay associated with the at least one IoT device over the display including the at least one IoT device when the at least one IoT device is recognized in the field of view of the AR camera device.

7. The method as in claim 1, further comprising presenting a reticle on the display of the AR camera device that identifies a focal point of the AR camera device and provides feedback to the user that the AR camera device is pointed at the interactable overlay associated with the at least one IoT device.

8. The method of claim 7, further comprising mounting the AR camera device in an electronic eyewear device worn by the user, wherein presenting the reticle on the display of the AR camera device comprises following at least one of head movement or eye movement of the user to determine a position of the reticle on the display of the AR camera device.

9. The method of claim 1, wherein presenting the interactable overlay on the display of the AR camera when the at least one IoT device is in a field of view of the AR camera device comprises presenting an interactable overlay including a virtual ON button and a virtual OFF button over the display including the at least one IoT device.

10. The method of claim 1, wherein presenting the interactable overlay on the display of the AR camera device when the at least one IoT device is in a field of view of the AR camera device comprises presenting an interactable overlay including a plurality of virtual buttons representing different commands over the display including the at least one IoT device.

11. A system that controls at least one Internet of Things (IoT) device in response to interaction with an interactable overlay displayed on a display of an augmented reality (AR) camera device, comprising:
a memory including the interactable overlay and control information associated with the at least one IoT device;
a processor;
at least one non-transitory computer readable medium having stored thereon first instructions, wherein execution of the first instructions by the processor causes the processor to provide an overlay generator that registers the interactable overlay with the at least one IoT device and presents the interactable overlay to the display of the AR camera device when the at least one IoT device is in a field of view of the AR camera device, and second instructions, wherein execution of the second instructions by the processor causes the processor to provide a command generator that receives an indication that the user has pointed the AR camera device at the interactable overlay associated with the at least one IoT device on the display of the AR camera device and generates and sends a control signal based on the control information associated with the interactable overlay pointed at by the AR camera device to the at least one IoT device that is associated with the interactable overlay pointed at by the AR camera device.

12. The system as in claim 11, wherein the indication that the user has pointed the AR camera device at the interactable overlay associated with the at least one IoT device on the display of the AR camera device is generated when a user points the AR camera device at the interactable overlay for a predetermined period of time.

13. The system as in claim 11, wherein the indication that the user has pointed the AR camera device at the interactable overlay associated with the at least one IoT device on the display of the AR camera device is generated when the user provides a selection input to the AR camera device while the AR camera device is pointed at the interactable overlay.

14. The system as in claim 13, wherein the selection input comprises at least one of a predetermined verbal message, a gesture, or a physical button selection on the AR camera device.

15. The system as in claim 14, wherein the interactable overlay includes instructions for providing the selection input.

16. The system as in claim 11, wherein the overlay generator comprises software that overlays the interactable overlay associated with the at least one IoT device over the display including the at least one IoT device when the at least one IoT device is recognized in the field of view of the AR camera device.

17. The system as in claim 11, wherein the overlay generator comprises software that presents a reticle on the display of the AR camera device that identifies a focal point of the AR camera device and provides feedback to the user that the AR camera device is pointed at the interactable overlay associated with the at least one IoT device.

18. The system of claim 17, wherein the AR camera device is mounted in an electronic eyewear device worn by the user, the electronic eyewear device including means for tracking at least one of head or eye movement of the user of the electronic eyewear device, and wherein the software presents the reticle on the display of the AR camera device by following at least one of head movement or eye movement of the user to determine a position of the reticle on the display of the AR camera device.

19. The system of claim 11, wherein the overlay generator presents an interactable overlay including a virtual ON button and a virtual OFF button over the display including the at least one IoT device or presents an interactable overlay including a plurality of virtual buttons representing different commands over the display including of the at least one IoT device.

20. A non-transitory computer readable medium having stored thereon instructions, wherein execution of the instructions by one or more processors cause the one or more processors to control at least one Internet of Things (IoT) device by performing operations including:
- pairing an interactable augmented reality (AR) overlay with the at least one IoT device, the interactable overlay including control information for generating a control signal for controlling the at least one IoT device when the interactable overlay is interacted with by an AR camera device;
- presenting the interactable overlay on a display of the AR camera device when the at least one IoT device is in a field of view of the AR camera device;
- receiving an indication that the user has pointed the AR camera device at the interactable overlay associated with the at least one IoT device on the display of the AR camera device; and
- in response to the indication, sending a control signal associated with the interactable overlay pointed at by the AR camera device to the at least one IoT device that is associated with the interactable overlay pointed at by the AR camera device.

* * * * *